United States Patent
Cheng et al.

(10) Patent No.: US 12,547,959 B2
(45) Date of Patent: Feb. 10, 2026

(54) METHODS AND ARRANGEMENTS TO LOG IMPLEMENTATION OF CONTROLS TO MITIGATE RISK

(71) Applicant: Capital One Services, LLC, McLean, VA (US)

(72) Inventors: Lin Ni Lisa Cheng, Great Neck, NY (US); Ryan M. Parker, The Colony, TX (US); Sergey Petrunin, Cambridge, MA (US); Gary B. Williams, Williamsburg, VA (US); Piper Alexandra Coble, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 354 days.

(21) Appl. No.: 18/155,944

(22) Filed: Jan. 18, 2023

(65) Prior Publication Data
US 2024/0242151 A1 Jul. 18, 2024

(51) Int. Cl.
| | |
|---|---|
| G06Q 10/0635 | (2023.01) |
| G06F 21/64 | (2013.01) |
| G06F 40/40 | (2020.01) |
| G06Q 10/107 | (2023.01) |
| H04L 9/32 | (2006.01) |
| H04L 51/212 | (2022.01) |

(52) U.S. Cl.
CPC ......... *G06Q 10/0635* (2013.01); *G06F 21/64* (2013.01); *G06F 40/40* (2020.01); *G06Q 10/107* (2013.01); *H04L 9/3236* (2013.01); *H04L 51/212* (2022.05); *G06Q 2220/00* (2013.01)

(58) Field of Classification Search
CPC .... H04L 51/212; G06F 40/40; G06Q 10/0635
USPC ......................................................... 726/26
See application file for complete search history.

(56) References Cited

U.S. PATENT DOCUMENTS

| | | | |
|---|---|---|---|
| 12,107,894 B1 * | 10/2024 | Acosta | H04L 67/5682 |
| 2013/0166657 A1 * | 6/2013 | Tadayon | G06Q 10/107 |
| | | | 709/206 |
| 2018/0124007 A1 * | 5/2018 | Ploch | H04L 51/234 |
| 2019/0180850 A1 * | 6/2019 | Shvartsman | G16H 10/40 |
| 2023/0412549 A1 * | 12/2023 | Lee | G06Q 10/107 |

\* cited by examiner

*Primary Examiner* — Zi Ye
(74) *Attorney, Agent, or Firm* — KDW Firm PLLC

(57) ABSTRACT

Logic may identify information of a first electronic mail document associated with a control, the control to comprise a process to mitigate a risk. Logic may select the electronic mail document based on the information. Logic may determine metadata for the electronic mail document, the metadata. Logic may generate a first value representative of the electronic mail document based on application of a mathematical algorithm. Logic may generate a log entry for the electronic mail document comprising the metadata and the first value. Logic may encrypt the log entry with an encryption key. And logic may store the log entry in an encrypted ledger with a log entry date and a unique log entry identifier.

20 Claims, 7 Drawing Sheets

METHODS AND ARRANGEMENTS TO LOG IMPLEMENTATION OF CONTROLS TO MITIGATE RISK

TECHNICAL FIELD

Embodiments disclosed herein relate to the field of computer architecture and software to manage controls. More specifically, embodiments disclosed herein may identify information in documents associated with a control, generate log entries for the documents, and store the log entries in a ledger.

BACKGROUND

Large organizations establish rules or guidance for operation of the organizations and establish processes and controls to manage risk while performing tasks related to the operation of the organizations. The tasks may involve internal requirements such as policy and operating procedures or may follow guidance offered through other organizations or government agencies such as regional regulations, industry standards, cybersecurity standards, and/or the like.

Such large organizations may hire employees, groups of employees, and/or outside consultants to review the rules and guidance and establish controls to follow obligations based on the rules and guidance. Such controls may include, for example, establishment of configurations and settings, maintenance of software licenses, obligations to install and configure specific versions of software packages on various computers such as servers, workstations, laptops, and/or the like. The controls may also include the performance of audits to verify the configurations and setting, maintenance of software licenses, installation and configuration of the software packages, and/or the like.

Organizations practicing risk management typically follow a repeating four step process for all instances where risk is inherent. The four step process typically includes steps for risk identification, risk assessment, risk mitigation, and risk monitoring. Risk management also integrates reporting in one or more of the steps.

DETAILED DESCRIPTION

Figure 1A:
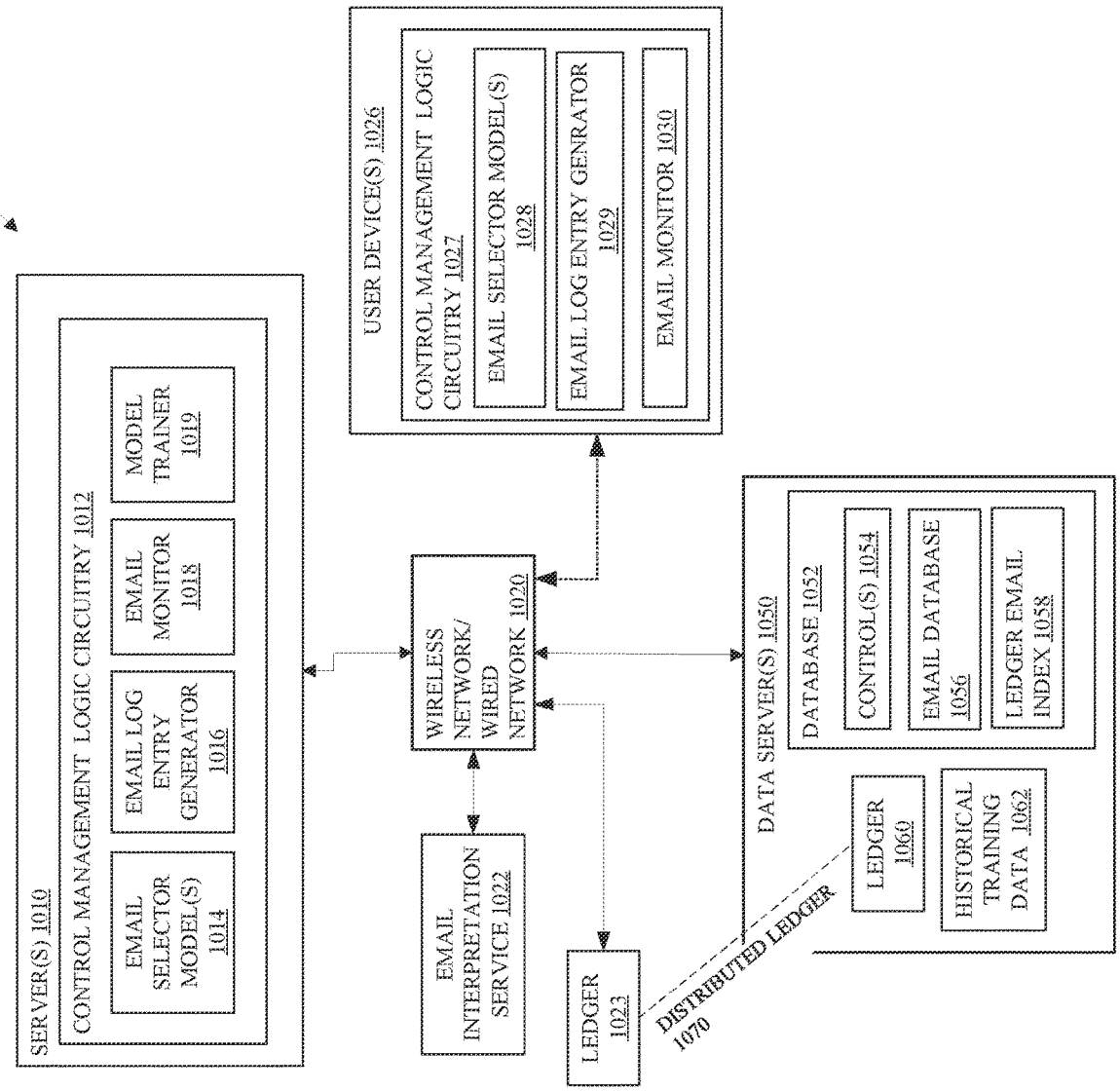
FIG. 1A depict embodiments of systems including servers, networks, and user devices for control management.

Organizations may devote a large amount of resources determining requirements and controls to mitigate the risk associated with a failure to perform the requirements. Regional regulations, industry standards, cybersecurity standards, and the like may include updates or publications of revisions of the regulations and/or standards periodically. Such revisions may include new requirements as well as revised requirements and existing requirements.

Once organizations establish controls to address requirements derived from internal and external guidance, such organizations may manage compliance with the controls by auditing the controls. Controls may define a configuration, setting, software version, and/or the like that are required for mitigation of risk related to failure to comply with requirements. Controls may also define inventories to create and maintain and/or other actions required for mitigation of risk.

Control management may involve, for instance, a periodic generation of a control management report produced via an audit to mitigate risk related to one or more controls. The control management reports may indicate failures to perform policies and/or procedures associated with one or more controls such as security updates for an operating system in one or more computers or may indicate that all computers are updated in accordance with the policies and procedures for the control. Such control management reports may be sent to, e.g., the head of the group tasked with performing the security updates for the computers so that any remaining issues may be resolved.

Organizations may also employ a regulator to audit the control management reports to verify that the control management reports are generated and communicated periodically. Control management reports (also referred to as audit reports) may verify the implementation of time restrictions on the security clearances for access to computers, servers, offices, and buildings; and the implementation of access authorizations and configurations established for general-employment and position-specific, network-based software applications and databases. The regulator may request and receive control management reports for one or more controls and verify that the control management reports were produced per the control policies and/or procedures and emailed to respective addressees per the control management reporting policies.

For auditing purposes, the regulator may request proof of implementation of controls such as electronic mail documents confirming the periodic generation and distribution of the control management reports. For instance, employment of an employee may involve a set of requirements in the form of actions including provision of hardware resources, installation of general employment software packages as well as position-specific software packages, provision of access to general employment and position-specific network resources, configuration of access to physical and hardware resources during specified hours during a day and specified days during a week, registration of security clearance for access to a physical building and an office, and/or the like. Many embodiments may have one or more controls for each action associated with employment of an employee, which include the action(s) to be performed and the time frame(s) within which to perform each of the action(s). A control management team may periodically generate reports related to the progress of actions related to employment of the employee until all the actions are completed.

Electronic mail document communications, also referred to as email communications, are maintained primarily in electronic form and, thus, are subject to manipulation by accident or tampering. To verify the veracity of such electronic mail document communications, the regulator may require some proof that the electronic submission of electronic mail document communications accurately depicts the execution of the associated controls.

Embodiments disclosed herein provide techniques, processes, and/or apparatuses for control management to mitigate risks associated with a set of controls by, advantageously, facilitating verification of the veracity of electronic mail documents (also referred to as email) including email attachments submitted to a regulator. Some embodiments include control management logic circuitry to process electronic mail documents to identify electronic mail documents that include information associated with a control. In some embodiments, the control management logic circuitry may select an electronic mail document for storage in a ledger; determine metadata for the electronic mail document such as an email identifier, an email address, and an email date; and generate a first value representative of the electronic mail document based on application of a mathematical algorithm. In some embodiments, the control management logic circuitry may generate a log entry for the electronic mail document comprising the metadata and the first value; encrypt the log entry with an encryption key; and store the log entry in the ledger with a log entry date and a unique log entry identifier.

In some embodiments, the control management logic circuitry may parse metadata of one or more electronic mail documents; infer information of a first electronic mail document associated with a set of controls; access the set of controls to obtain tags associated with the set of controls; and correlate the information with the set of controls based on the tags associated with the set of controls. In some embodiments, the control management logic circuitry may select the electronic mail document based on correlation of the information with the tags; generate a log entry for the electronic mail document comprising metadata and a first value, the first value comprising an encoded representation of the electronic mail document; and store the log entry in an encrypted ledger with a log entry date and a unique log entry identifier.

Some embodiments may include processing model(s) to implement a content categorization process using machine learning (ML) or other artificial intelligence (AI) technologies to automate the process of locating, categorizing, and/or organizing categorized text, pictures, attachments, and or other content in electronic mail documents. Some embodiments may implement a content categorization process to associate electronic mail documents with subject matter represented by tags to correlate the content of electronic mail documents with subject matter associated with controls. For instance, a control may include a control management report to mitigate risk associated with a regulatory requirement for cybersecurity to maintain data privacy of customer accounts. The control may involve verification of the version of software installed on certain servers and/or workstations based on the functionality performed by those servers and/or workstations. The software may include an operating system, an encryption algorithm, or the like, and the version may include the latest version of the software. A control management team may audit these computers to verify the version installed on the computers and produce a control management report that lists each of the computers that performs the subject functionality, the version of the software installed on each of the computers, and indication as to whether the versions of the software installed are the versions that should be installed on the computers.

After generation of the control management report, the control management team may issue the control management report to individuals in an organization that are responsible to maintain the versions of software in the machines such as an information technology (IT) team. In many of these embodiments, the control management logic circuitry may monitor electronic mail documents traversing an email server for the organization and logs the electronic mail documents of the control management reports into a ledger such as an encrypted ledger or a blockchain. The control management logic circuitry may capture metadata from the electronic mail document such as an email identifier (ID); at least one of the email addresses associated with the from, to, cc, and/or bcc fields of the electronic mail document; and the date that the electronic mail document is sent by an email sender and/or received by the email recipient.

In some embodiments, the control management logic circuitry may capture metadata from the attached control management report such as a title of the control management report, the author(s) of the control management report, text of the control management report, and/or the like. When there are more than one attachment such as images captured from the computers, a report from the OS of each computer, and/or the like showing the installed software version, the control management logic circuitry may capture metadata about the additional attachments as well as a count of the attachments.

In many embodiments, the control management logic circuitry may generate a first value of the electronic mail document based on a mathematical algorithm such as a checksum, a hash function, and/or the like. In some of these embodiments, the control management logic circuitry may generate a second value based on the same or a different mathematical algorithm such as a checksum, a hash function, and/or the like, of each of the attachments of the electronic mail document. In some embodiments, the hash function may comprise a cryptographic hash function.

The first value may comprise a hash or checksum of the body of the electronic mail document, a hash or checksum of the metadata of the electronic mail document, a hash or checksum of the metadata combined with the body of the electronic mail document, a combination thereof, and/or the like. The second value may comprise a hash or checksum of an attachment; a hash or checksum of metadata extracted from the attachment such as the title, author(s), publisher, publication number, publication date, and content; a hash or checksum of more than one attachment and/or metadata of the more than one attachment, a combination thereof; and/or the like. For example, a control management report may have attachments including one or more screen shots from each associated computer showing software versions of installed software and/or software packages, versions of installed hardware, versions of attached hardware and firmware for attached hardware, versions of drivers for installed and attached hardware, access logs, a combination thereof, and/or the like.

In some embodiments, the control management logic circuitry may generate a log entry for inclusion in the ledger such as a set of the metadata as unencrypted data and a set of encrypted data. Furthermore, the control management logic circuitry may add unencrypted log data to a log entry such as a unique log entry ID and a log entry date. In other embodiments, a computer system that maintains the ledger may add log data to each log entry such as a unique log entry ID and a log entry date responsive to provision by the control management logic circuitry of the log entry to the ledger for storage.

In many embodiments, the ledger is a distributed ledger 1070. In such embodiments, multiple ledgers are maintained at different locations and each of the multiple ledgers may maintain the same log entries to improve the integrity of the ledger.

In some embodiments, the control management logic circuitry may comprise a server component and/or a user device component. For instance, the control management logic circuitry may be installed and executed entirely from a user device such as a standalone application or a browser plugin; the control management logic circuitry may be installed and executed entirely from a server or set of servers; or the control management logic circuitry may be installed and executed partially from a server or set of servers and partially from a user device. For example, the control management logic circuitry may comprise a software component installed on a set of one or more servers and a software component installed as a standalone application or as a browser plugin on a user device. The control management logic circuitry of the user device may communicate with the control management logic circuitry of the server(s) to coordinate functionality.

In some embodiments, the control management logic circuitry may further perform operations to monitor for additional electronic mail documents in an email thread associated with the first electronic mail document; and store, in the encrypted ledger, a log entry for each of the additional electronic mail documents in an email thread associated with the first electronic mail document. In some embodiments, the control management logic circuitry may identify an electronic mail document being sent, generate a log entry for the electronic mail document, and add the log entry for the electronic mail document to the ledger. In other embodiments, the control management logic circuitry may identify an electronic mail document being transmitted to each addressee, generate a log entry for the electronic mail document being sent and the electronic mail document sent to each addressee, and add log entries for each of the electronic mail documents to the ledger.

In some embodiments, the control management logic circuitry may further perform operations to monitor for attempts to modify the first electronic mail document and the additional electronic mail documents in an email thread associated with the first electronic mail document; and block the attempts to modify the first electronic mail document and the additional electronic mail documents in an email thread associated with the first electronic mail document. For instance, a user may delete unimportant electronic mail documents on a regular basis and may accidentally or inadvertently delete an electronic mail document that is marked as being entered into a log entry of the ledger. In response, the control management logic circuitry installed on the user device or on the one of the servers may detect that the user instructed deletion of an electronic mail document logged into the ledger, block the deletion, and display a message on the user device indicating that the electronic mail document is logged in the ledger and cannot be deleted. For embodiments that maintain electronic mail documents on servers and map the electronic mail documents to the user device such as Internet Message Access Protocol (IMAP) addressing, the servers may verify each deletion request is not associated with an electronic mail document that is logged into the ledger. For embodiments that transmit electronic mail documents to the user device and only maintain the electronic mail documents temporarily on an email server such as a point-of presence (POP) addressing, the control management logic circuitry installed on the user device may verify that the electronic mail document is not logged into the ledger prior to performing the deletion.

In some embodiments, the control management logic circuitry may train one or more AIs such as a machine learning model to identify the tags associated with an electronic mail document and/or to classify or determine the probability that an electronic mail document is associated with a control or a set of controls. For example, the control management logic circuitry may train a tag model with historical electronic mail documents to generate a set of one or more tags to identify the content of the electronic mail document that may be associated with a control or a set of controls. In some embodiments, the historical electronic mail documents may include a classification as being associated with the control or the set of controls or not associated with the control or the set of controls. In such embodiments, the tag model may receive the electronic mail document in a form of input data such as a vector, a matrix, or a combination of one or more vectors and matrices. Based on the input, the tag model may output one or more tags associated with the electronic mail document. Backpropagation logic may compare the output of the tag model against the given tags and backpropagate an error function output by the comparison through the tag model to train the tag model.

As a further example, the control management logic circuitry may train a correlation model with historical electronic mail documents to generate a classification of the electronic mail document as related or not related, or to generate a probability as an output to indicate the likelihood that the electronic mail document is related to a control or a set of controls. In such embodiments, the correlation model may receive the electronic mail document in a form of input data such as a vector, a matrix, or a combination of one or more vectors and matrices. Based on the input, the correlation model may output a classification, or a probability associated with the electronic mail document. Backpropagation logic may compare the output of the correlation model against the given classifications or probabilities and backpropagate an error function output by the comparison through the correlation model to train the correlation model.

Once the machine learning engine is trained, the machine learning engine may operate in inference mode to output tags associated with electronic mail documents or to classify or determine a probability of a classification as related to a control or a set of controls. In some embodiments, the machine learning engine may continue to learn based on feedback from one or more users or user groups related to the selection of electronic mail documents to include in the ledger.

Note that tags generally describe any information, label, data, metadata, index, offset, word or phrase, keyword, and/or the like used to associate subject matter of electronic mail documents and subject matter of controls with categories such as user groups, specific users, employment categories of users, document types, requirements categories, report types, audit categories, and/or any other way to categorize an electronic mail document, attachment, or control with which the tags are associated.

In this description, numerous specific details, such as component and system configurations, may be set forth to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some of, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Figure 1B:
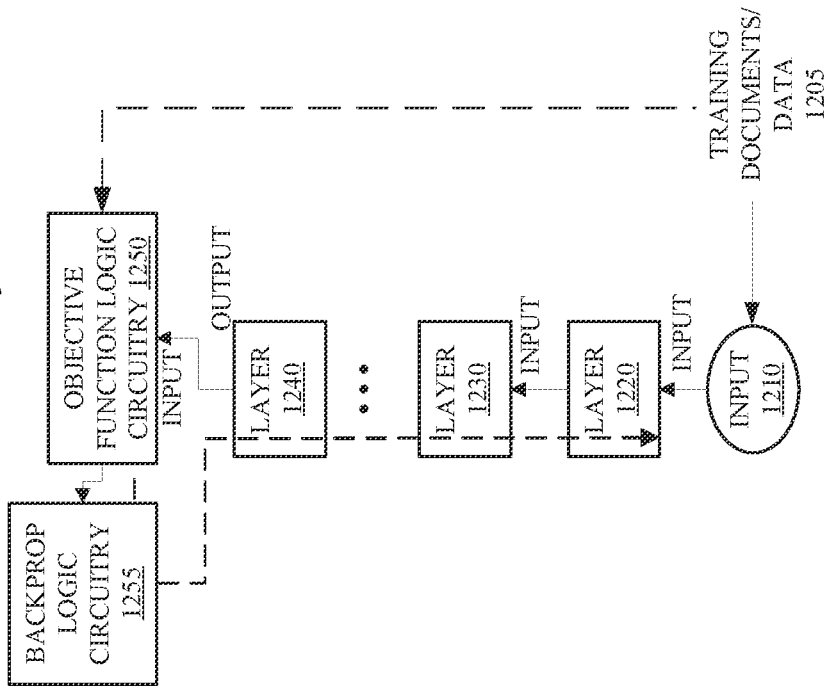
FIG. 1B depicts an embodiment of a log entry for a ledger for control management.
Figure 1C:
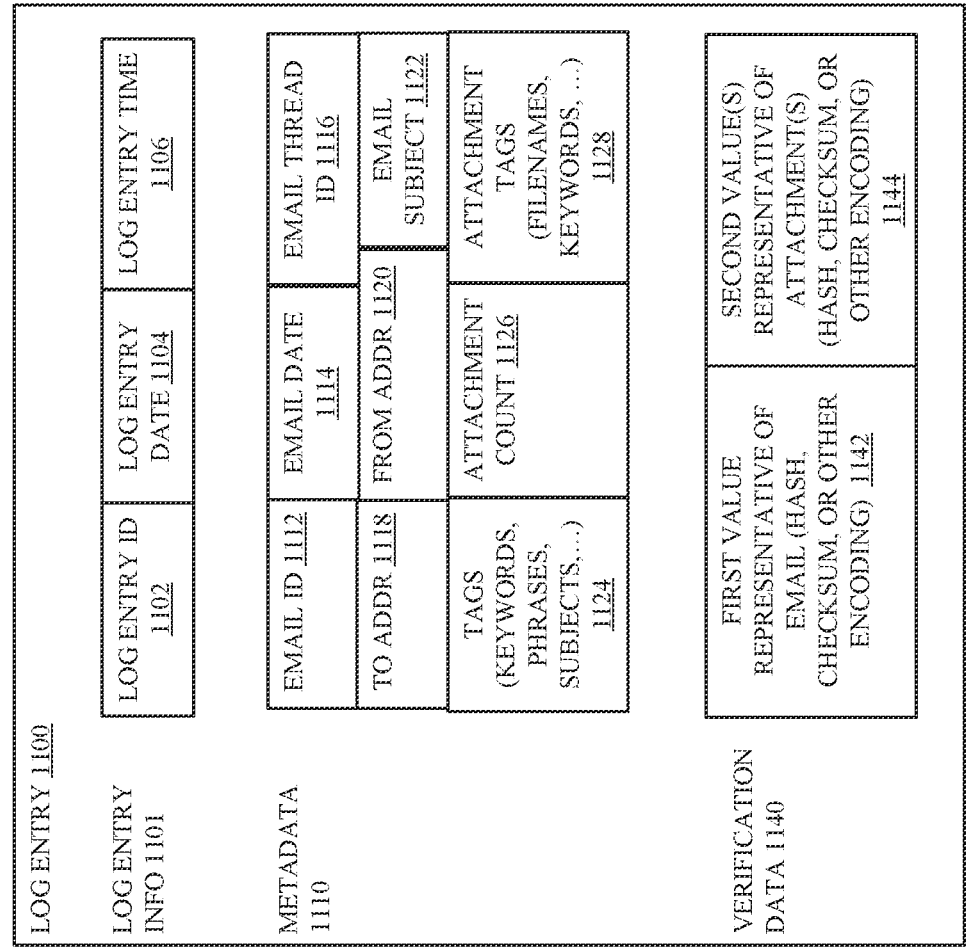
FIG. 1C depicts an embodiment of a neural network as a machine learning model for training and inference to implement functionality for control management.

Turning now to the drawings, FIGS. 1A-C depict embodiments of systems, apparatuses, logic circuitry, and models including servers, networks, data servers, and software applications to manage controls and associated data. FIG. 1A illustrates an embodiment of a system 1000. The system 1000 may represent a portion of at least one wireless or wired network 1020 that interconnects server(s) 1010 with data server(s) 1050. The at least one wireless or wired network 1020 may represent any type of network or communications medium that can interconnect the server(s) 1010 and the data server(s) 1050, such as a Ethernet, Gigabit Ethernet, fiber, cellular service, a cellular data service, satellite service, other wireless communication networks, fiber optic services, other land-based services, and/or the like, along with supporting equipment such as hubs, routers, switches, amplifiers, and/or the like.

In the present embodiment, the server(s) 1010 may represent one or more servers owned and/or operated by a single company or organization. In some embodiments, the server(s) 1010 represent more than one company that provides services. The server(s) 1010 may comprise control management logic circuitry 1012 and the control management logic circuitry 1012 may include email selector model(s) 1014, an email log entry generator 1016, email monitor model(s) 1018, and a model trainer 1019. The control management logic circuitry 1012 may reside on a single server of the server(s) 1010, may be distributed as different portions on more than one of the server(s) 1010, and/or may be distributed as more than one copies of the same and/or overlapping portions of the control management logic circuitry 1012 on more than one of the server(s) 1010. In some embodiments, the control management logic circuitry 1012 may also distributed between the server(s) 1010 and the user device(s) 1026. In other embodiments, the control management logic circuitry 1012 may reside entirely on one or more of the user device(s) 1026. The control management logic circuitry 1012 may comprise server software, standalone software on the server(s) 1010 and/or the user device(s) 1026, a browser plugin on the server(s) 1010 and/or the user device(s) 1026, a combination thereof, or the like.

The model(s) may comprise algorithms or machine learning models such as statistical models, neural networks or other machine learning models. In many embodiments, the email selector model(s) 1014 may have access to or include natural language processing (NLP) or other language processing to process electronic mail documents (emails) and attachments such as control management reports, meeting notes, and/or other control related correspondence, to identify information of the electronic mail documents that might be associated with a control. The control may comprise a process to mitigate a risk such as electronic mail documents related to performance of an audit and/or to report results from an audit related to the control.

In some embodiments, the email selector model(s) 1014 may identify tags in electronic mail documents to detect electronic mail documents that are related to controls or control management and may correlate the tags with tags of the controls 1054 in the database 1052 to determine a likelihood that the electronic mail document has content related to one or more of the controls 1054. In some embodiments, the email selector model(s) 1014 may access external services for some functionality to identify electronic mail documents related to controls and to select the electronic mail documents based on a correlation of the tags identified in the electronic mail documents and tags associated with the controls 1054.

In the present embodiment, the email selector model(s) 1014 may have access an email interpretation service 1022 that includes natural language processing to process electronic mail documents. The email selector model(s) 1014 may receive an electronic mail document or a location from which to access an electronic mail document and send the electronic mail document or the location to the email interpretation service 1022 to identify metadata of the electronic mail document and generate tags representative of the electronic mail document or content of the electronic mail document. The tags may include metadata from the electronic mail document, excerpts of text from the electronic mail document, keywords in the electronic mail document, keywords associated with content or subject matter identified in the electronic mail documents, a combination thereof, and/or the like. The metadata of the electronic mail document may include, for example, an email identifier (ID), one or more email addresses, an email date, an email subject, and email body. In some embodiments, the metadata may also include metadata captured from one or more email attachments of the electronic mail document. For instance, the email attachments may include word processor documents, portable document formats (PDF), image files, and/or the like, which may include metadata such as the author, title, subject, publisher, location, date, time, etc. In some embodiments, the email interpretation service 1022 may extract tags from attachments that include text, codes, titles, authors, tables, graphs, pictures, and/or the like by identifying the available information in the attachments such as in the text, filenames, table names, graph titles, footnotes, etcetera.

The email ID may also be referred to as an Internet message ID, a message ID, a "Message-ID", or a client ID, and may be used to track electronic mail documents in an email server such as an Exchange server or an online email server. While the email ID may identify a unique electronic mail document, there may be multiple copies of the electronic mail document in various email boxes such as a sent box for a sender and an inbox for a recipient.

In many embodiments, the email interpretation service 1022 may identify tags for the electronic mail document that are also associated the controls 1054 in a database 1052 of the data server(s) 1050. For instance, the email interpretation service 1022 may comprise tags for controls or may access tags for the controls 1054 in the database 1052. The email interpretation service 1022 may match the tags for the controls with text, metadata, and/or the like in the electronic mail document to identify one or more tags to provide to the email selector model(s) 1014. In many embodiments, the email interpretation service 1022 may transmit the metadata and tags to the email selector model(s) 1014 for further processing.

In some embodiments, the email selector model(s) 1014 may include the functionality of the email interpretation service 1022 rather than interacting with the email interpretation service 1022 to identify the metadata and tags associated with the controls 1054. After determining the metadata and tags of the electronic mail document associated with the controls 1054, the email selector model(s) 1014 may correlate the tags determined for the electronic mail document with the tags associated with the controls 1054 in the database 1052.

The correlation may include a mathematical function to determine a probability that the tags associated with the electronic mail document. In some embodiments, the correlation may involve an inference by a machine learning engine that is trained with the tags of the controls 1054 to classify the electronic mail document as related or not related to the controls 1054 or to determine a probability that the electronic mail document is related to the controls 1054. For classification, the email selector model(s) 1014 may select the electronic mail document to log into the ledger 1023 and 1060 in response to a classification as related to the controls 1054. For the probability, the email selector model(s) 1014 may select the electronic mail document to log into the ledger 1023 and 1060 in response to a probability that exceeds a threshold for being related to the controls 1054 and not select the electronic mail document to log into the ledger 1023 and 1060 in response to a probability that lower than or equal to the threshold for being related to the controls 1054.

The ledger 1023 and the ledger 1060 may comprise a distributed ledger 1070. In many embodiments, the distributed ledger 1070 may include more than one copies of the same log entries to help to prevent loss of one or more logs due to a hardware failure or due to tampering. In many embodiments, the distributed ledger 1070 may include software to store log entries and to regulate access to the ledgers 1023 and 1060. For instance, upon selection of an electronic mail document to log into the distributed ledger 1070, the control management logic circuitry 1012 may provide a log entry to the distributed ledger 1070 and the distributed ledger 1070 may generate a unique log ID, capture a timestamp for a log time and capture a log date for the log entry. The distributed ledger 1070 may include the unique log ID, log time, and log date as log entry information in the log entry for the electronic mail document. In many embodiments, the distributed ledger 1070 may store the log ID, log date, log time, and email ID in a ledger email index 1058 after or contemporaneously with storing the log entry into the ledgers 1023 and 1060. In other embodiments, the distributed ledger 1070 may provide the log ID, log date, log time, and email ID to the control management logic circuitry 1012 or 1026 and the control management logic circuitry 1012 or 1026 may store the log ID, log date, log time, and email ID in a ledger email index 1058.

In some embodiments, the email selector model(s) 1014 may include one or more models per control in the controls 1054. In other embodiments, one email selector model(s) 1014 may be trained to select electronic mail documents related to any one or more of the controls 1054.

In some embodiments, the email selector model(s) 1014 may interact with a user at a user device(s) 1026 by providing the user with the selected electronic mail documents, requesting that the user confirm that the selected electronic mail document is related to a control, receiving feedback to confirm that the electronic mail document is or is not related to at least one of the controls 1054. In some embodiments, the email selector model(s) 1014 may interact with a user to confirm tags identified are descriptive of the electronic mail document and descriptive of the corresponding controls 1054. For instance, the email selector model(s) 1014 may present the tags for the electronic mail document in a graphical user interface (GUI) of a display such as the display 2035 shown in FIG. 2B and a user of the user device 1026 may provide feedback via the GUI.

In some embodiments, after receipt of the input from the user, the user device 1026 may transmit the input to the email selector model(s) 1014 and one or more of the email selector model(s) 1014 may backpropagate the input from the user to learn from the feedback. In some embodiments, the email selector model(s) 1014 may only backpropagate negative feedback from the user (e.g., the tag does not represent the electronic mail document). In other embodiments, the email selector model(s) 1014 may only backpropagate positive feedback from the user (e.g., the tag does represent the electronic mail document). In further embodiments, the email selector model(s) 1014 may backpropagate both positive and negative feedback from the user.

After selecting an electronic mail document to log the distributed ledger 1070 (ledgers 1023 and 1060), the email log entry generator 1016 may generate a log entry for the electronic mail document for storage in the ledgers 1023 and 1060 and may, in some embodiments, store a copy of the electronic mail document in the email database 1056. The email log entry generator 1016 may generate a log entry with metadata captured from the electronic mail document and a first value that comprises an encoding of the electronic mail document to provide evidence for verification of the veracity of the electronic mail document. For instance, a control management team may provide an electronic mail document (or a copy of the electronic mail document from the email database 1056) to a regulator as evidence of a control management report being transmitted on a particular date. The regulator may access a log ID stored in the ledger email index 1058 associated with the email ID of the electronic mail document. After determining the log ID, the regulator may use an encryption key assigned to the regulator to access the email log entry in the ledger 1023.

The distributed ledger 1070 may be protected by a set of keys and possibly certificates associated with a hierarchical encryption and key management infrastructure. The hierarchical encryption and key management infrastructure may allow the issuance keys that have access to defined portions of encrypted data, have a defined set of permissions with respect to the access to the encrypted data, and may have further restrictions to access such as restrictions related to days of the week, times of day, months of the year, computers or medium access control (MAC) addresses from which the key can access the encrypted data, Internet Protocol (IP) addresses from which the key can access the encrypted data, a combination thereof, and/or the like. In some embodiments, the ledger 1023 and the ledger 1060 may use double confirmation using shared keys. For example, the regulator may hold a private key A for case one and key B for case two where other parties hold the other set of keys such as a public key A for case one and a public key B for case two. In some of these embodiments, the private key A may provide the regulator with access to a first set of cases associated the private key A and private key B may provide the regulator with access to a different set of cases associated with private key B. In some embodiments, the first set of cases and the second set of cases may have overlapping cases. In other embodiments, the first set of cases and the second set of cases do not include overlapping cases. With the private keys, the regulator may decrypt an entry for the case as needed to perform an audit.

In some embodiments, the other parties may comprise different organizations to which the regulator is assigned to perform audits. In other embodiments, a different private key may be associated with each case to provide access for the regulator to only the cases to which the regulator is assigned. In some embodiments, the regulator may be assigned a set of two or more private keys and an organization may be assigned two or more corresponding public keys of public/private key pairs so the organization may use the set of two or more public keys to encrypt cases to delineate access to the cases between the corresponding private keys.

The keys may comprise symmetric keys, asymmetric keys, or a combination thereof. For example, the regulator may have a symmetric key that provides the regulator with read only access to email log entries in the ledger 1023. Other keys may provide write only access for storing new log entries, access to change permissions associated with certain keys, and/or the like.

The regulator may read the metadata from the log associated with the log ID for the electronic mail document and may compare the metadata to, e.g., the sender address and recipient addresses in the electronic mail document. In many embodiments, the regulator may also generate a first value of the electronic mail document provided to the regulator and compare the first value to the first value stored in the log entry of the ledger 1023 to verify the veracity of the electronic mail document provided to the regulator. The first value may be a checksum for the electronic mail document, a hash of the electronic mail document, and/or the like. In some embodiments, the process for generating the checksum or the hash may comprise a well-known cryptographic hash function such as a Secure Hash Algorithm 1 (SHA-1), Secure Hash Algorithm 2 (SHA-2), Secure Hash Algorithm 3 (SHA-3), and/or the like, or a message authentication code such as a keyed-hash message authentication code (HMAC). If the first value that the regulator generates with the electronic mail document matches the first value stored in the log entry, the veracity of the electronic mail document provided to the regulator is confirmed.

The control management logic circuitry 1012 may further comprise email monitor 1018 to monitor for additional electronic mail documents in an email thread that includes an email selected for storage in the ledgers 1023 and 1060, or already stored in the ledgers 1023 and 1060. In many embodiments, electronic mail documents within the same email thread may be selected for storage in the distributed ledger 1070 based on inclusion of one of the electronic mail documents in the email thread being stored in the distributed ledger 1070.

In response to detecting a subsequent electronic mail document in an email thread that has at least one log entry in the ledger, the email monitor 1018 may pass the electronic mail document to the email log entry generator 1016 to create a log entry for the subsequent electronic mail document. The email log entry generator 1016 may generate a log entry for the subsequent electronic mail document and transmit the log entry to the distributed ledger 1070 to store in the ledgers 1023 and 1060. In some embodiments, the email log entry generator 1016 may also store the electronic mail document in the email database 1056 and the distributed ledger 1070 or the control management logic circuitry 1012 may store the log ID, email ID, and an email thread ID in the ledger email index 1058. In some embodiments, the email monitor 1018 may also store an email thread ID in the ledger email index 1058 for the first electronic mail document of the thread of electronic mail documents that has a log entry in the distributed ledger 1070.

In some embodiments, the control management logic circuitry 1012 may comprise a model trainer 1019. The model trainer 1019 may train a machine learning engine to determine tags to associate with an electronic mail document that are based on tags associated with the controls 1054. In some embodiments, the model trainer 1019 may train a machine learning engine to determine to classify an electronic mail document as related or not related to the controls 1054. In some embodiments, the model trainer 1019 may train a machine learning engine to determine the probability that an electronic mail document as related or not related to the controls 1054.

The model trainer 1019 may access historical electronic mail documents associated with one or more controls in the historical training data 1062 and generate training data based on the historical electronic mail documents to train a machine learning engine to infer an association between electronic mail documents and the one or more controls.

In many embodiments, the model trainer 1019 may provide hundreds or thousands of electronic mail documents that are already classified as being related to a control in the controls 1054 to train the machine learning engine to infer an association between electronic mail documents and the one or more controls. The model trainer 1019 may divide the training data into a training portion and a validation portion. The model trainer may provide input data to the machine learning engine from the training portion, calculate an error function based on the output of the machine learning model and backpropagate the error function through the machine learning engine to train the machine learning engine with each of the electronic mail documents in the training portion of the training data.

After training the machine learning engine with the training portion of the training data, the model trainer may provide input data for electronic mail documents in the validation portion of the training data. The validation portion of the training data may allow the model trainer 1019 or a user to evaluate the performance of the machine learning engine to determine if further training is needed. For instance, if the machine learning engine correctly classifies electronic mail documents at calculated rate and the calculated rate is greater than a threshold rate such as eight out of ten or nine out of ten electronic mail documents, training for the machine learning engine may be complete. On the other hand, if the machine learning engine correctly classifies electronic mail documents at calculated rate and the calculated rate is less than a threshold rate such as two out of ten or four out of ten electronic mail documents, training for the machine learning engine may require additional training.

The user device(s) 1026 may comprise a control management logic circuitry 1027 performs the functionality described for the control management logic circuitry 1012 or that coordinates functionality of the control management logic circuitry 1027 with the control management logic circuitry 1012. In many embodiments, the control management logic circuitry 1027 comprises a standalone application, a browser plugin, or an email program plugin or extension.

For embodiments in which the control management logic circuitry 1027 operates in lieu of the control management logic circuitry 1012, the control management logic circuitry 1027 may interact with the email interpretation service 1022 or perform the same functionality within the user device(s) 1026. The control management logic circuitry 1027 may include email selector model(s) 1028 to identify electronic mail documents being transmitted from the user device(s) 1026, identify information from the electronic mail document such as metadata and tags and correlate the information and tags against the tags of the controls 1054. In some embodiments, the control management logic circuitry 1027 may also receive an indication from a user via a GUI that the electronic mail document is related to a control or should otherwise be designated for logging into the distributed ledger 1070. In further embodiments, the control management logic circuitry 1027 may request that a user confirm that an electronic mail document should be logged in to the distributed ledger 1070.

Based on the correlation and/or indications from the user, the email selector model(s) 1028 may select the electronic mail document, the email log entry generator 1029 may generate a log entry for the electronic mail document and send the log entry to the distributed ledger 1070 for storage, and the email monitor 1030 may monitor for additional electronic mail documents in the same email thread to log in the distributed ledger 1070 and the ledger email index 1058. The control management logic circuitry 1027 may also include a copy of each electronic mail document selected in the email database 1056 along with an email ID, an email thread ID, and a log entry ID.

For embodiments in which the control management logic circuitry 1027 operates in conjunction with the control management logic circuitry 1012, the control management logic circuitry 1027 may select electronic mail documents at the user device(s) 1026 based on user interaction via a GUI. For instance, the control management logic circuitry 1027 may include a check box or other selection that offers the user an opportunity to mark the electronic mail document as an electronic mail document associated with a control. In some embodiments, the control management logic circuitry 1027 may identify tags in the subject line or body of the electronic mail document that correspond to tags of the controls 1054 while a user drafts the electronic mail document and/or after the user presses a send button via the GUI for the control management logic circuitry 1027. Thereafter, the control management logic circuitry 1027 may transmit the selection and/or tags to the email selector model(s)s 1014 for further processing.

FIG. 1B depicts an embodiment of a log entry 1100 for a ledger for control management such as the ledgers 1023 and 1060 and the control management logic circuitry 1012 and 1027 shown in FIG. 1A. The log entry 1100 provides one example of the information that may be stored in a log entry for a ledger. Other embodiments may comprise less of the information and still other embodiments may include more information. Some embodiments may comprise similar or the same information in different formats.

The log entry 1100 may include three types of information such as log entry information 1101, metadata 1110, and verification data 1140. The log entry information 1101 may comprise a log entry ID 1102, a log entry date 1104, and a log entry time 1106. In many embodiments, the log entry information 1101 may be generated or captured at the time a log entry is provided to the ledger for storage in the ledger.

The metadata 1110 may include an email ID 1112, an email date 1114, and an email thread ID 1116. The metadata 1110 may also include one or more recipient email addresses (to addr 1118), a sender's email address (from addr 1120), and an email subject 1122. In some embodiments, the metadata 1110 may also include tags 1124 such as keywords, phrases, subjects, categories, and/or the like. The tags 1124 may include tags determined for the electronic mail document to correlate the electronic mail document with one or more controls.

In some embodiments, the metadata 1110 may include an attachment count 1126 that is a count value indicative of the number of attachments connected to the electronic mail document. The metadata 1110 may also include attachment tags 1128. The attachment tags 1128 may include tags determined based on analysis of the attachments such as filenames, keywords, phrases, and/or the like captured or inferred from the attachments. Note that in other embodiments, the attachment tags and the tags associated with the electronic mail document all fall under tags associated with the electronic mail document.

The log entry 1100 may also comprise verification data in the form of a first value 1142 that is encoded data for the electronic mail document and optionally a second value(s) 1144 for each of the attachments or for the combination of all the attachments of the electronic mail document. The first value and the second value(s) 1144. The first value and the second value may be created with the same mathematical functions or by different mathematical functions. The mathematical functions may include hash functions, checksum functions, and/or other encoding functions.

FIG. 1C generally describes a way to train a machine learning engine such as a neural network (NN) 1200 with supervision (supervised learning). FIG. 1C depicts an embodiment of a neural network (NN) 1200 of a control management logic circuitry, such as the email selector model(s) 1014 and 1028 and the email interpretation service 1022 (which may also be included in the control management logic circuitry 1012 and/or 1027) shown in FIG. 1A. The NN 1200 may comprise as a deep neural network (DNN).

A DNN is a class of artificial neural network with a cascade of multiple layers that use the output from the previous layer as input. An example of a DNN is a recurrent neural network (RNN) where connections between nodes form a directed graph along a sequence. A feedforward neural network is a neural network in which the output of each layer is the input of a subsequent layer in the neural network rather than having a recursive loop at each layer.

Another example of a DNN is a convolutional neural network (CNN). A CNN is a class of deep, feed-forward artificial neural networks. A CNN may comprise of an input layer and an output layer, as well as multiple hidden layers. The hidden layers of a CNN typically consist of convolutional layers, pooling layers, fully connected layers, and normalization layers.

The NN 1200 comprises an input layer 1210, and three or more layers 1220 and 1230 through 1240. The input layer 1210 may comprise input data including training data training documents/data 1205, such as the historical training data 1062 shown in FIG. 1A, to train the model(s) 1014, 1028, and the email interpretation service 1022 to perform functionality discussed herein. The input layer 1210 may provide the data in the form of tensor data to the layer 1220. The tensor data may include a vector, matrix, or the like with values associated with each input feature of the NN 1200.

In many embodiments, the input layer 1210 is not modified by backpropagation. The layer 1220 may compute an output and pass the output to the layer 1230. Layer 1230 may determine an output based on the input from layer 1220 and pass the output to the next layer and so on until the layer 1240 receives the output of the second to last layer in the NN 1200. Depending on the methodology of the NN 1200, each layer may include input functions, activation functions, and/or other functions as well as weights and biases assigned to each of the input features. The weights and biases may be randomly selected or defined for the initial state of a new model and may be adjusted through training via backwards propagation (also referred to as backpropagation or backprop). When retraining a model with, e.g., user feedback obtained after an initial training of the model, the weights and biases may have values related to the previous training and may be adjusted through retraining via backwards propagation.

The layer 1240 may generate an output, such as a probability or classification, and pass the output to an objective function logic circuitry 1250. The objective function logic circuitry 1250 may determine errors in the output from the layer 1240 based on an objective function such as a comparison of the predicted results against the expected results from the training documents/data 1205. For instance, the expected results may be paired with the input in the training data supplied for the NN 1200 for supervised training. In one embodiment, the model may represent a machine learning engine to classify electronic mail documents as related to controls or not related to controls and the expected results may include decisions previous made about whether the electronic mail documents in the training data were related to controls.

During the training mode, the objective function logic circuitry 1250 may output errors to backpropagation logic circuitry 1255 to backpropagate the errors through the NN 1200. For instance, the objective function logic circuitry 1250 may output the errors in the form of a gradient of the objective function with respect to the input features of the NN 1200.

The backpropagation logic circuitry 1255 may propagate the gradient of the objective function from the top-most layer, layer 1240, to the bottom-most layer, layer 1220 using the chain rule. The chain rule is a formula for computing the derivative of the composition of two or more functions. That is, if f and g are functions, then the chain rule expresses the derivative of their composition f°g (the function which maps x to f(g(x))) in terms of the derivatives of f and g. After the objective function logic circuitry 1250 computes the errors, backpropagation logic circuitry 1255 backpropagates the errors. The backpropagation is illustrated with the dashed arrows.

When operating in inference mode, the models 1014 and 1028 and the email interpretation service 1022 shown in FIG. 1A, may receive feedback related to which electronic mail documents selected are relate to controls and, in some embodiments, the feedback may identify tags associated with the electronic mail document that correlate with tags of the controls. If the feedback is negative, the backpropagation may attribute an error to the output. If the feedback is positive, the backpropagation may reinforce or bias selection of the output within the layers of the NN 1200.

Figure 2:
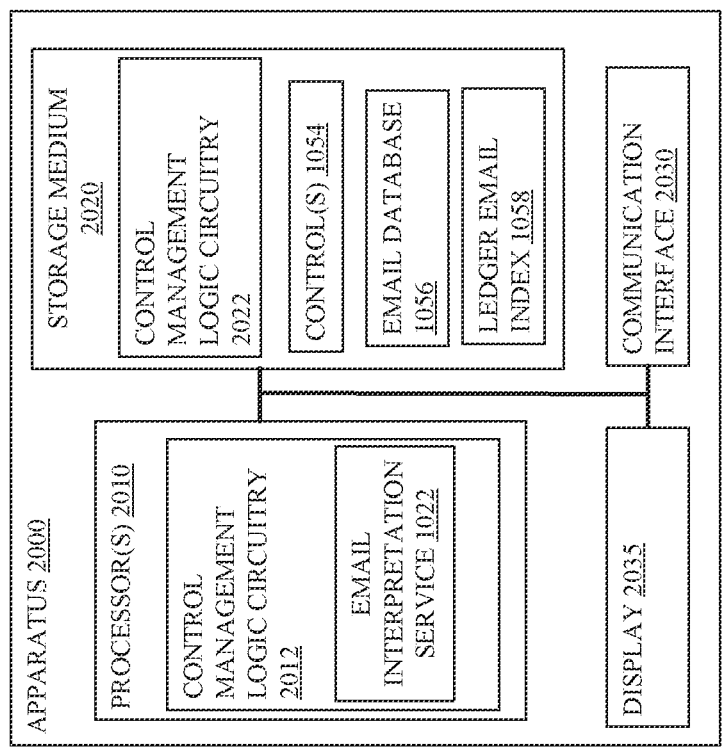
FIG. 2 depicts an embodiment of logic circuitry for control management.

FIG. 2 depicts an embodiment for an apparatus 2000 such as one of the server(s) 1010 and/or the user device 1026 shown in FIG. 1A. The apparatus 2000 may be a computer in the form of a smart phone, a tablet, a notebook, a desktop computer, a workstation, or a server. The apparatus 2000 can combine with any suitable embodiment of the systems, devices, and methods disclosed herein. The apparatus 2000 can include processor(s) 2010, a non-transitory storage medium 2020, communication interface 2030, and a display device 2035. The processor(s) 2010 may comprise one or more processors, such as a programmable processor (e.g., a central processing unit (CPU)). The processor(s) 2010 may comprise processing circuitry to implement control management logic circuitry 2012 such as the email selector model(s) 1014, email log entry generator 1016, email monitor 1018, model trainer 1019, and email interpretation service 1022 of the control management logic circuitry 1012 in FIG. 1A.

The processor(s) 2010 may operatively couple with a non-transitory storage medium 2020. The non-transitory storage medium 2020 may store logic, code, and/or program instructions executable by the processor(s) 2010 for performing one or more instructions including the control management logic circuitry 2012. The non-transitory storage medium 2020 may comprise one or more memory units (e.g., removable media or external storage such as a secure digital (SD) card, random-access memory (RAM), a flash drive, a hard drive, and/or the like). The memory units of the non-transitory storage medium 2020 can store logic, code and/or program instructions executable by the processor(s) 2010 to perform any suitable embodiment of the methods described herein. For example, the processor(s) 2010 may execute instructions such as instructions of the control management logic circuitry 2012 causing one or more processors of the processor(s) 2010 represented by the control management logic circuitry 2012 for control management.

The non-transitory storage medium 2020 may store code and data for the control management logic circuitry 2012 and store controls 1054, an email database 1056, and a ledger email index 1058 as shown in FIG. 1A.

The processor(s) 2010 may couple to a communication interface 2030 to transmit and/or receive data from one or more external devices (e.g., a terminal, display device, a smart phone, a tablet, a server, a printer, or other remote device). The communication interface 2030 includes circuitry to transmit and receive communications through a wired and/or wireless media such as an Ethernet interface, a wireless fidelity (Wi-Fi) interface, a cellular data interface, and/or the like. In some embodiments, the communication interface 2030 may implement logic such as code in a baseband processor to interact with a physical layer device to transmit and receive wireless communications such as a log entry to a ledger 1060 or a distributed ledger 1070 or historical training data 1062 from a data server such as the data server(s) 1050 shown in FIG. 1A. For example, the communication interface 2030 may implement one or more of local area networks (LAN), wide area networks (WAN), infrared, radio, Wi-Fi, point-to-point (P2P) networks, telecommunication networks, cloud communication, and the like.

Figure 3B:
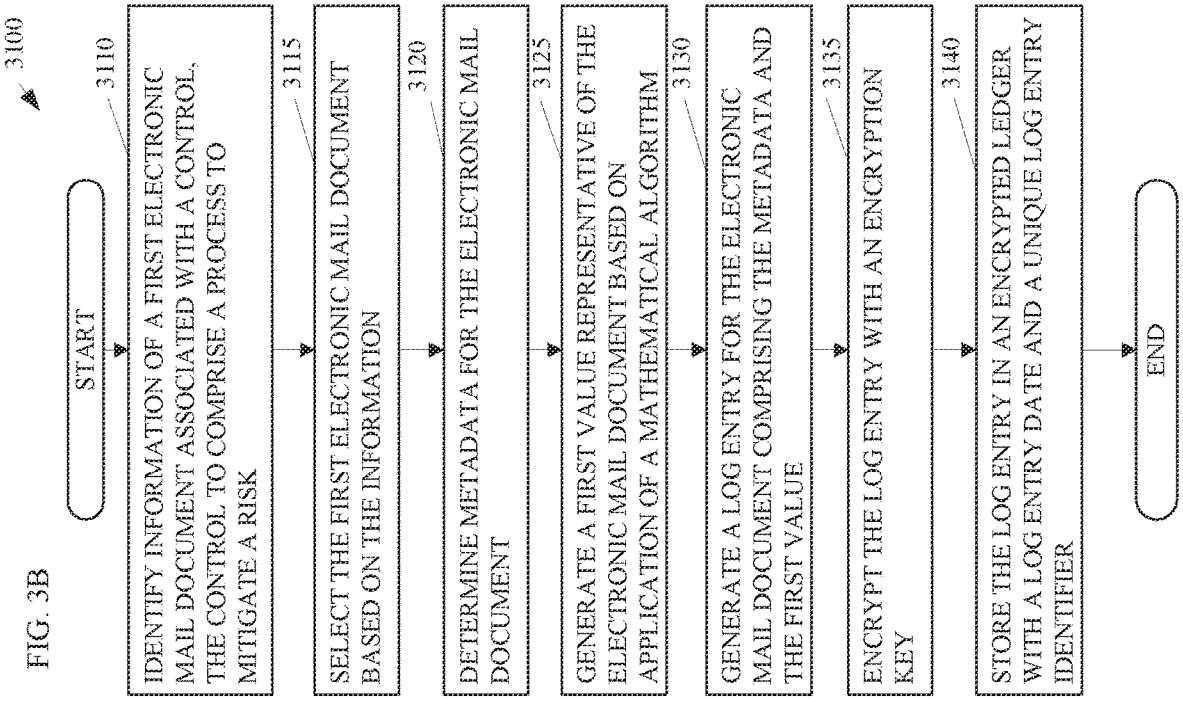
FIGS. 3A-C depict flowcharts of embodiments for control management such as the systems and apparatuses shown in FIGS. 1A-C and 2.
Figure 3A:
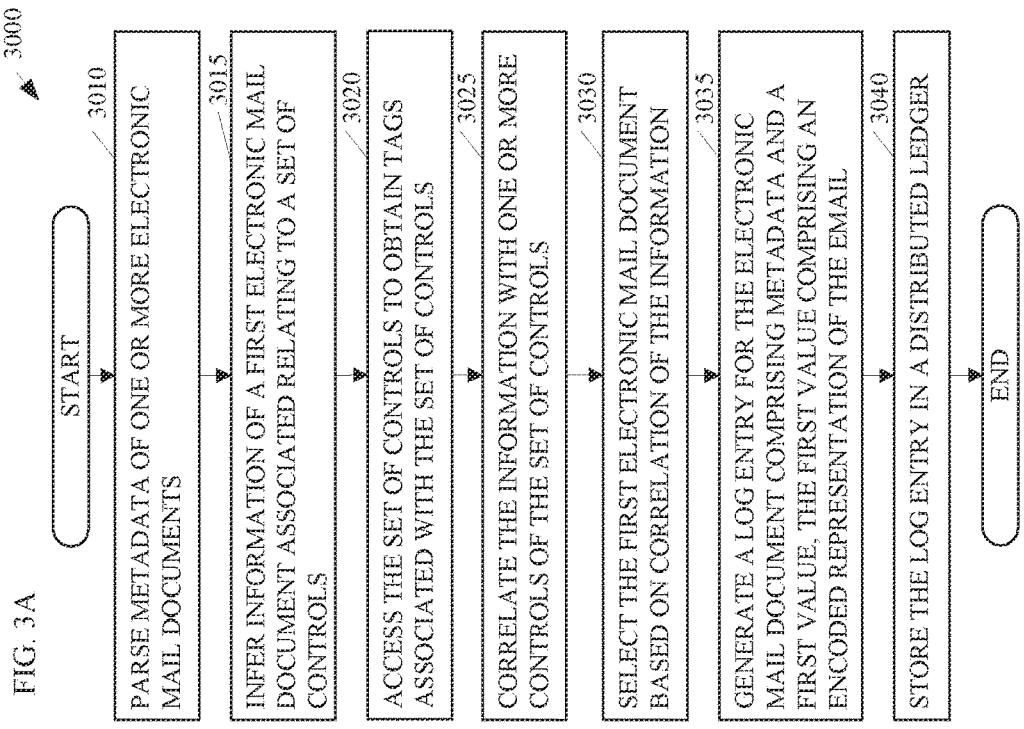

FIG. 3A illustrates an embodiment of a flowchart of a process 3000 for an email selector model to process documents such as the email selector model(s) 1014 shown in FIG. 1A. The process 3000 begins with parsing metadata of one or more electronic mail documents (element 3010). The email selector model(s) may identify and parse portions of the one or more electronic mail documents that may include an email ID, an email thread ID, a sender's email address, one or more recipient addresses, and/or the like. The email selector model(s) may also infer information such as tags of a first electronic mail document associated relating to a set of controls (element 3015).

After inferring information from the first electronic mail document, the email selector model(s) may access the set of controls to obtain tags associated with the set of controls (element 3020) and correlate the information with one or more controls of the set of controls (element 3025). In some embodiments, the control management logic circuitry may display the correlations on a GUI and request that the user provide a confirmation that the first electronic mail document is related to one or more controls. In some embodiments, the control management logic circuitry may also display an explanation or description of the control or controls with which the first electronic mail document appears to be associated and request that the user confirm if possible.

After correlating the information from the first electronic mail document with the tags of the controls, the email selector model(s) may select the first electronic mail document based on correlation of the information (element 3030).

After the email selector model(s) select the first electronic mail document, the log entry generator may generate a log entry for the electronic mail document comprising metadata and a first value, the first value comprising an encoded representation of the email (element 3035) and may store the log entry in a distributed ledger (element 3040). In further embodiments, an email monitor may monitor for additional electronic mail documents in an email thread associated with the first electronic mail document and store, in the ledger, a log entry for each of the additional electronic mail documents in an email thread associated with the first electronic mail document.

In some embodiments, the control management logic circuitry may monitor for attempts to modify the first electronic mail document and the additional electronic mail documents in an email thread associated with the first electronic mail document and block the attempts to modify the first electronic mail document and the additional electronic mail documents in an email thread associated with the first electronic mail document.

In some of these embodiments, the control management logic circuitry may parse metadata by operations to generate input data based on the metadata of the first electronic mail document and attachments and to provide the input data to a natural language processor. The natural language processor may determine tags associated with the first electronic mail document.

In some of these embodiments, the control management logic circuitry may correlate the one or more tags with the one or more controls via a machine learning engine to classify the electronic mail document as related to the set of controls. In some of these embodiments, the control management logic circuitry may correlate the one or more tags with the one or more controls via a machine learning engine to determine a probability that the electronic mail document is related to the one or more controls.

In some embodiments, the control management logic circuitry may generate input data for an inference engine based on the first electronic mail document, provide the input data to the input of the inference engine, and determine that the first electronic mail document is associated with the control based on the output of the inference engine. In some embodiments, the inference engine comprises a machine learning engine trained with training data including electronic mail documents associated with one or more controls in a set of controls, the one or more controls to include the control.

In some embodiments, the metadata comprises a from email address, a to email address, a cc email address, a subject line, and one or more control identifiers. And, in some embodiments, the first value comprises a checksum of the electronic mail document, a hash of the electronic mail document, or a combination thereof.

FIG. 3B illustrates an embodiment of a flowchart of a process 3100 for control management circuitry to analyze a first electronic mail document to identify information, correlate the information with tags associated with controls, and store a log entry for the first electronic mail document such as the control management circuitry 1012 shown in FIG. 1A. The process 3100 begins with identifying information of a first electronic mail document associated with a control (element 3110). The control may comprise a process to mitigate a risk such as a control management process to produce a control management report. After identifying the information from the first electronic mail document, the control management logic circuitry may select the first electronic mail document based on the information (element 3115). For instance, the control management logic circuitry may determine that a correlation between the information and tags associated with the control indicates that the content of the first electronic mail document relates to the control. For instance, the correlation may generate a correlation value that reaches or exceeds a correlation threshold value.

After selecting the first electronic mail document, the control management logic circuitry may determine metadata for the electronic mail document (element 3120) and generate a first value representative of the electronic mail document based on application of a mathematical algorithm (element 3125). The control management logic circuitry may also generate a log entry for the electronic mail document comprising the metadata and the first value (element 3130).

After generating the log entry, control management logic circuitry may encrypt the log entry with an encryption key (element 3130) and store the log entry in an encrypted ledger with a log entry date and a unique log entry identifier (element 3140). In many embodiments, the control management logic circuitry may further monitor for additional electronic mail documents in an email thread associated with the first electronic mail document and store, in the encrypted ledger, a log entry for each of the additional electronic mail documents in an email thread associated with the first electronic mail document.

The control management logic circuitry may also monitor for attempts to modify the first electronic mail document and the additional electronic mail documents in an email thread associated with the first electronic mail document and block the attempts to modify the first electronic mail document and the additional electronic mail documents in an email thread associated with the first electronic mail document.

In some embodiments, the control management logic circuitry may select the electronic mail document by identifying one or more tags associated with the control and correlating the one or more tags with the information. In some embodiments, the control management logic circuitry may select the electronic mail document by identifying one or more tags associated with the control and correlating the one or more tags with the information associated with an attachment of in the first electronic mail document.

In many embodiments, the control management logic circuitry may identify information by generating input data for an inference engine based on the first electronic mail document, providing the input data to the input of the inference engine, and determining that the first electronic mail document is associated with the control based on the output of the inference engine. In some embodiments, the inference engine comprises a machine learning engine trained with training data including electronic mail documents associated with one or more controls in a set of controls, the one or more controls to include the control.

In some embodiments, the metadata comprises a from email address, a to email address, a cc email address, a subject line, and one or more control identifiers. In some embodiments, the metadata comprises information from attachments of the first electronic mail document. And, in some embodiments, the first value comprises a checksum of the electronic mail document, a hash of the electronic mail document, or a combination thereof.

Figure 3C:
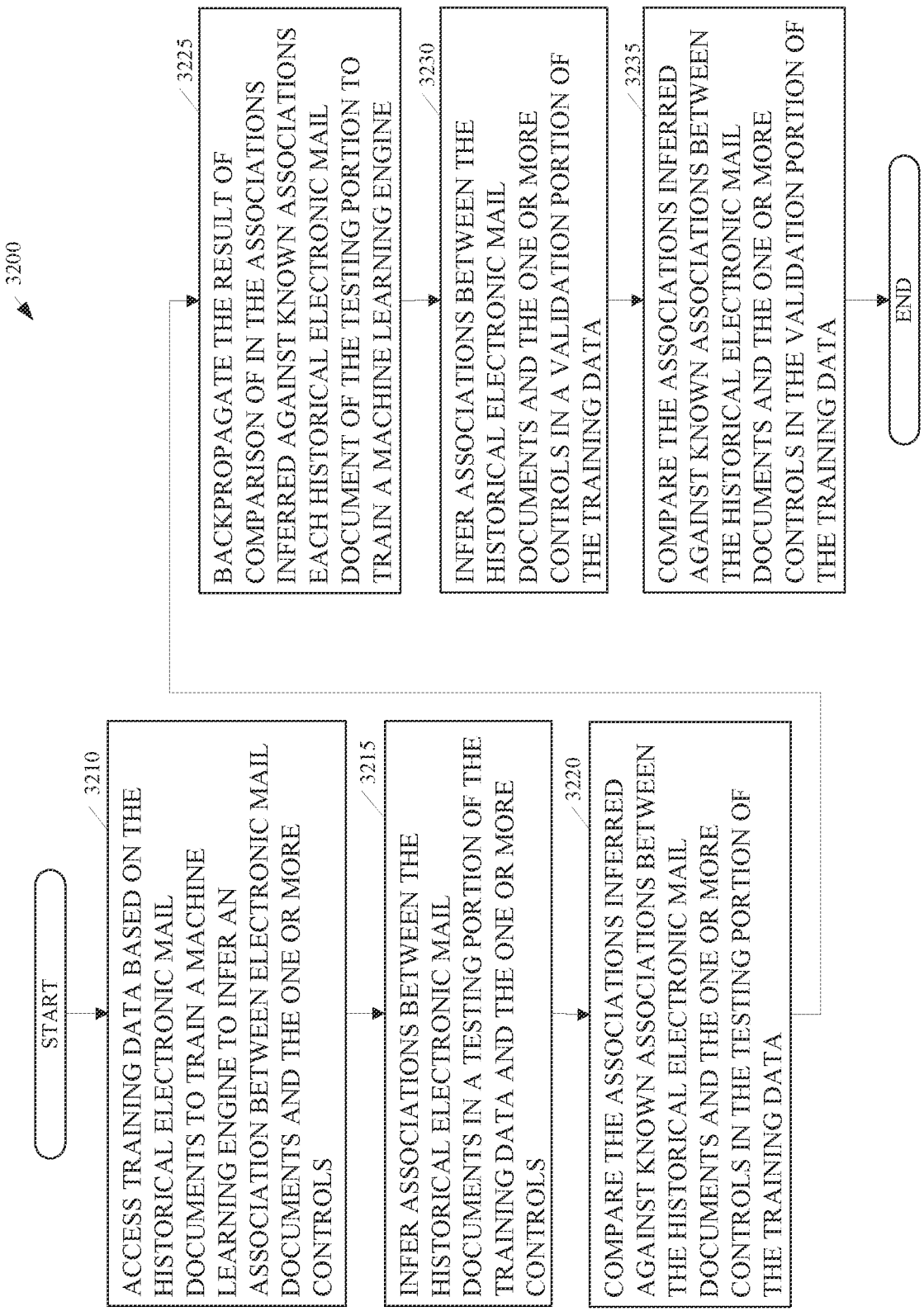

FIG. 3C illustrates an embodiment of a flowchart of a process 3200 for training a model such as the email selector model(s) 1014 and 1028 shown in FIG. 1A and the NN 1200 shown in FIG. 1C. The process 3200 begins with accessing training data based on the historical electronic mail documents to train a machine learning engine to infer an association between electronic mail documents and the one or more controls (element 3210) and inferring associations between the historical electronic mail documents in a testing portion of the training data and the one or more controls (element 3215).

Based on the inferred associations, objective function logic circuitry may compare the associations inferred against known associations between the historical electronic mail documents and the one or more controls in the testing portion of the training data (element 3220). The objective function logic circuitry may backpropagate the result of comparison of in the associations inferred against known associations each historical electronic mail document of the testing portion to train a machine learning engine (element 3225).

After training the machine learning engine, the control logic circuitry may infer associations between the historical electronic mail documents and the one or more controls in a validation portion of the training data (element 3230). Some embodiments may then compare the associations inferred against known associations between the historical electronic mail documents and the one or more controls in the validation portion of the training data (element 3235).

If the comparison element 3235 verifies that the machine learning engine is trained, the machine learning engine may be set to inference mode and installed in a computer to infer associations between electronic mail documents and the one or more controls. Otherwise, the machine learning engine may receive additional training.

Figure 4:
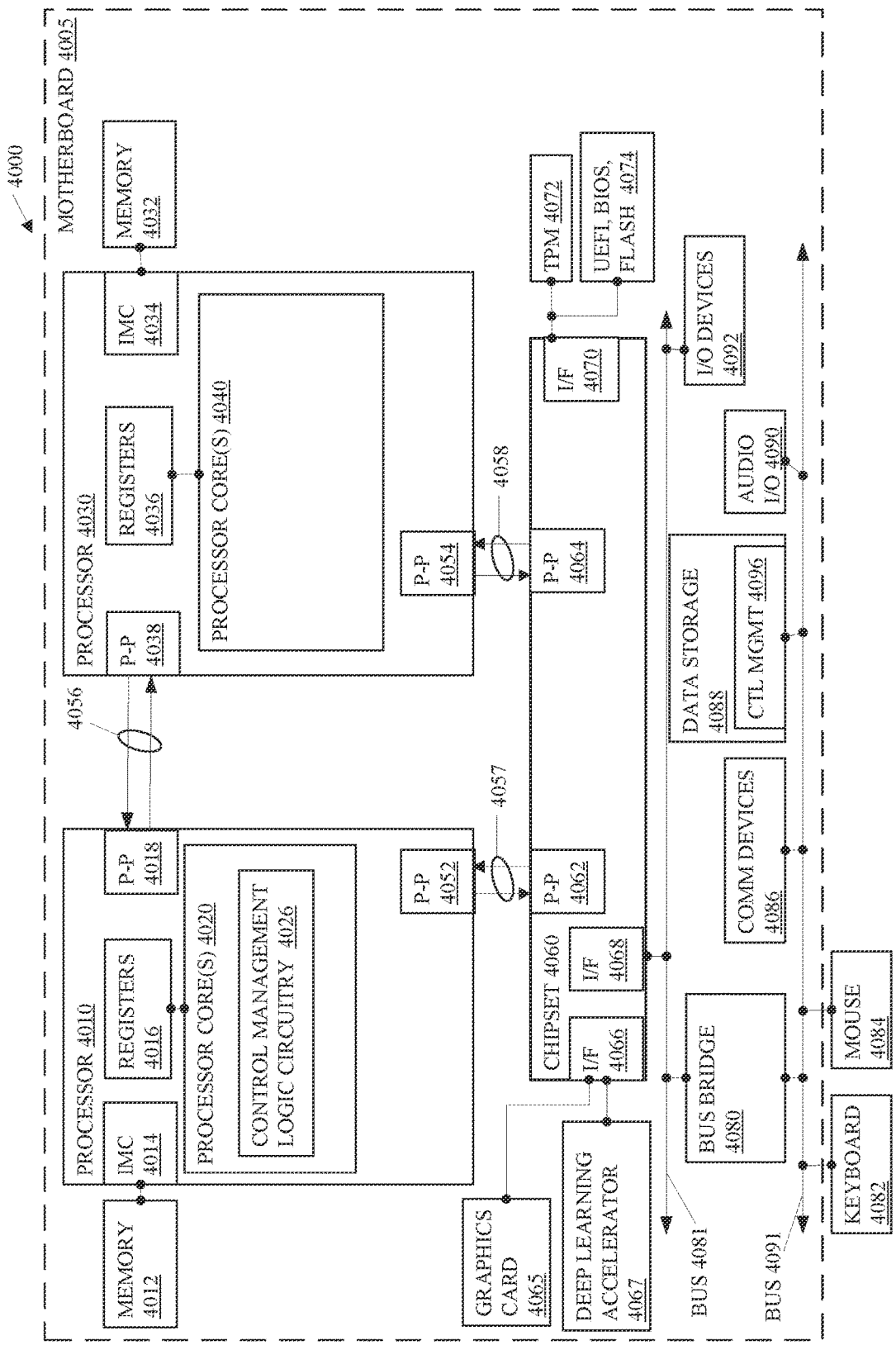
FIG. 4 depicts an embodiment of a system including a multiple-processor platform, a chipset, buses, and accessories such as the servers, apparatuses, and user devices shown in FIGS. 1A and 2.

FIG. 4 illustrates an embodiment of a system 4000 such as a server of the server(s) 1010, data server(s) 1050 and user device 1026 shown in FIG. 1A or the apparatus 2000 shown in FIG. 2. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a control management logic circuitry 4026 such as the control management logic circuitry 1012, 1027, 2012, and 2022 shown in FIGS. 1A and 2. The control management logic circuitry 4026 may represent circuitry configured to process electronic mail documents, to identify electronic mail documents related to controls or control management of the controls within the processor core(s) 4020. The control management logic circuitry 4026 may represent a combination of the circuitry within a processor and a medium to store all or part of the functionality of the control management logic circuitry 4026 in memory such as cache, the memory 4012, buffers, registers, and/or the like. In several embodiments, the functionality of the control management logic circuitry 4026 resides in whole or in part as code in a memory such as the control management logic circuitry 4096 in the data storage unit 4088 attached to the processor 4010 via a chipset 4060 such as the control management logic circuitry 1012, 1027, 2012, and 2022 shown in FIGS. 1A and 2. The functionality of the control management logic circuitry 4026 may also reside in whole or in part in memory such as the memory 4012 and/or a cache of the processor. Furthermore, the functionality of the control management logic circuitry 4026 may also reside in whole or in part as circuitry within the processor 4010 and may perform operations, e.g., within registers or buffers such as the registers 4016 within the processor 4010, registers 4036 within the processor 4030, or within an instruction pipeline of the processor 4010 or the processor 4030.

In other embodiments, more than one of the processor 4010 and 4030 may comprise functionality of the control management logic circuitry 4026 such as the processor 4030 and/or the processor within the deep learning accelerator 4067 coupled with the chipset 4060 via an interface (I/F)

4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the control management logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
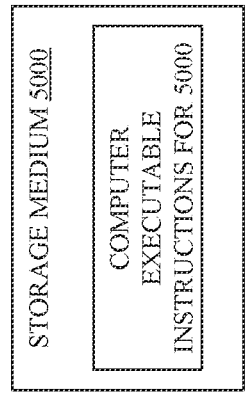
FIGS. 5-6 depict embodiments of a storage medium and a computing platform such as the server and the user devices shown in FIGS. 1A-C and 2.

FIG. 5 illustrates an example of a storage medium 5000 to store control management logic circuitry such as the control management logic circuitry 1012, 1027, 2012, 2022, 4026, and 4096 as shown in FIGS. 1A, 2, and 4. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
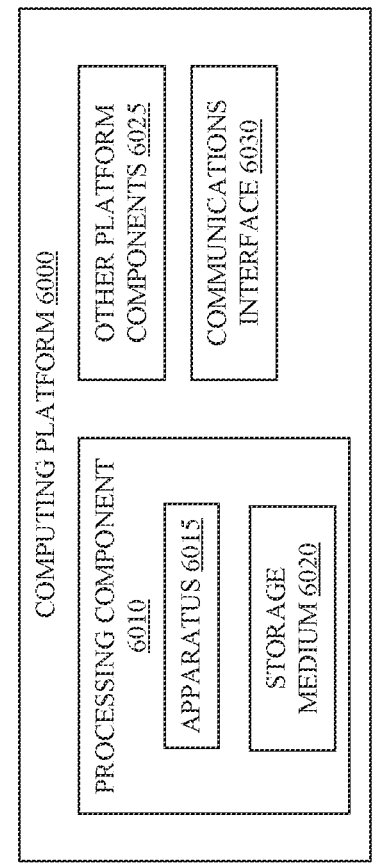

FIG. 6 illustrates an example computing platform 6000 such as the server(s) 1010, apparatus 2000, and the system 4000 shown in FIG. 4. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the control management logic circuitry 1012, 1027, 2012, and 2022 illustrated in FIGS. 1A and 2. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium such as the storage medium 5000 shown in FIG. 5. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively.

What has been described above includes examples of the disclosed architecture. It is, of course, not possible to describe every conceivable combination of components and/or methodologies, but one of ordinary skill in the art may recognize that many further combinations and permutations are possible.

What is claimed is:

1. An apparatus comprising:
    memory; and
    logic circuitry coupled with the memory to perform operations to:
    identify information of a first electronic mail document associated with a control, the control to comprise a process to mitigate a risk;
    select the first electronic mail document based on the information;
    determine metadata for the first electronic mail document, the metadata comprising an email identifier, an email address, and an email date;
    generate a first value representative of the electronic mail document based on application of a mathematical algorithm;
    generate a log entry for the electronic mail document comprising the metadata and the first value;
    encrypt the log entry with an encryption key;
    store the log entry in an encrypted ledger with a log entry date and a unique log entry identifier;
    detect an attempt to delete or modify the first electronic mail document;
    determine that the first electronic mail document is associated with the log entry in the encrypted ledger; and
    prevent deletion or modification of the first electronic mail document after a determination that the first electronic mail document is associated with the log entry in the encrypted ledger.

2. The apparatus of claim 1, the logic circuitry to further perform operations to:
    monitor for additional electronic mail documents in an email thread associated with the first electronic mail document; and
    store, in the encrypted ledger, a log entry for each of the additional electronic mail documents in an email thread associated with the first electronic mail document.

3. The apparatus of claim 2, the logic circuitry to further perform operations to:
    monitor for attempts to modify the first electronic mail document and the additional electronic mail documents in an email thread associated with the first electronic mail document; and
    block the attempts to modify the first electronic mail document and the additional electronic mail documents in an email thread associated with the first electronic mail document.

4. The apparatus of claim 1, the operation to select the electronic mail document to include operations to:
    identify one or more tags associated with the control, and
    correlate the one or more tags with the information.

5. The apparatus of claim 1, the operation to select the electronic mail document to include operations to:
    identify one or more tags associated with the control, and
    correlate the one or more tags with the information associated with an attachment of in the first electronic mail document.

6. The apparatus of claim 1, the operation to identify information to include operations to:
    generate input data for an inference engine based on the first electronic mail document,
    provide the input data to the input of the inference engine, and
    determine that the first electronic mail document is associated with the control based on an output of the inference engine.

7. The apparatus of claim 6, wherein the inference engine comprises a machine learning engine trained with training data including electronic mail documents associated with one or more controls in a set of controls, the one or more controls to include the control.

8. The apparatus of claim 1, wherein the metadata comprises a from email address, a to email address, a cc email address, a subject line, and one or more control identifiers.

9. The apparatus of claim 1, wherein the metadata comprises information from attachments of the first electronic mail document.

10. The apparatus of claim 1, wherein the first value comprises a checksum of the electronic mail document, a hash of the electronic mail document, or a combination thereof.

11. A non-transitory storage medium containing instructions, which when executed by a processor, cause the processor to perform operations, the operations to:
    parse metadata of one or more electronic mail documents;
    infer information of a first electronic mail document associated with a set of controls;
    access the set of controls to obtain data associated with the set of controls;
    correlate the information with the set of controls based on the data associated with the set of controls;
    select the first electronic mail document based on correlation of the information;
    generate a log entry for the electronic mail document comprising metadata and a first value, the first value comprising an encoded representation of the electronic mail document; and
    store the log entry in an encrypted ledger with a log entry date and a unique log entry identifier;
    detect an attempt to delete or modify the first electronic mail document;
    determine that the first electronic mail document is associated with the log entry in the encrypted ledger;
    prevent deletion or modification of the first electronic mail document after a determination that the first electronic mail document is associated with the log entry in the encrypted ledger.

12. The non-transitory storage medium of claim 11, wherein the operations further comprise operations to:
    monitor for additional electronic mail documents in an email thread associated with the first electronic mail document; and
    store, in the encrypted ledger, a log entry for each of the additional electronic mail documents in an email thread associated with the first electronic mail document.

13. The non-transitory storage medium of claim 12, wherein the operations further comprise operations to:
    monitor for attempts to modify the first electronic mail document and the additional electronic mail documents in an email thread associated with the first electronic mail document; and
    block the attempts to modify the first electronic mail document and the additional electronic mail documents in an email thread associated with the first electronic mail document.

14. The non-transitory storage medium of claim 11, wherein the operation to parse metadata includes operations to:
    generate input data based on the metadata of the first electronic mail document and attachments, and
    provide the input data to a natural language processor, the natural language processor to determine tags associated with the first electronic mail document.

15. The non-transitory storage medium of claim 14, wherein the operation to infer information includes operations to correlate the one or more tags with the one or more controls via a machine learning engine to classify the electronic mail document as related to the set of controls or to determine a probability that the electronic mail document is related to the one or more controls.

16. The non-transitory storage medium of claim 11, wherein the operation to infer information includes operations to:
    generate input data for an inference engine based on the first electronic mail document,
    provide the input data to the input of the inference engine, and
    determine that the first electronic mail document is associated with the control based on an output of the inference engine.

17. The non-transitory storage medium of claim 16, wherein the inference engine comprises a machine learning engine trained with training data including electronic mail documents associated with one or more controls in a set of controls, the one or more controls to include the control.

18. The non-transitory storage medium of claim 11, wherein the metadata comprises a from email address, a to email address, a cc email address, a subject line, and one or more control identifiers.

19. The non-transitory storage medium of claim 11, wherein the first value comprises a checksum of the electronic mail document, a hash of the electronic mail document, or a combination thereof.

20. A method comprising:
    parsing metadata of one or more electronic mail documents;
    inferring information of a first electronic mail document associated with a set of controls;
    accessing the set of controls to obtain data associated with the set of controls;
    correlating the information with the set of controls based on the data associated with the set of controls;
    selecting the first electronic mail document based on correlation of the information;
    generating a log entry for the electronic mail document comprising metadata and a first value, the first value comprising an encoded representation of the electronic mail document;
    storing the log entry in an encrypted ledger with a log entry date and a unique log entry identifier;
    detecting an attempt to delete or modify the first electronic mail document;
    determining that the first electronic mail document is associated with the log entry in the encrypted ledger; and
    preventing deletion or modification of the first electronic mail document after a determination that the first electronic mail document is associated with the log entry in the encrypted ledger.

* * * * *